United States Patent [19]

Nightingale et al.

[11] Patent Number: 4,502,636
[45] Date of Patent: Mar. 5, 1985

[54] VARIABLE GEOMETRY EJECTOR NOZZLE FOR TURBOMACHINES

[75] Inventors: Douglas J. Nightingale, Atlanta; Gary F. Szuminski, Marietta, both of Ga.

[73] Assignee: Rolls-Royce Inc., New York, N.Y.

[21] Appl. No.: 366,389

[22] Filed: Apr. 7, 1982

[51] Int. Cl.³ .................. F02K 1/12; F02K 1/09; F02K 1/28
[52] U.S. Cl. .................. 239/265.17; 239/265.25; 239/265.39
[58] Field of Search .......... 239/265.17, 265.19, 239/265.25, 265.33, 265.37, 265.41; 60/228, 271; 244/23 R

[56] References Cited

U.S. PATENT DOCUMENTS 3,493,178  2/1970  Bruner ............... 239/265.19 X
4,145,877  3/1979  Montgomery ............ 60/226.2

FOREIGN PATENT DOCUMENTS 792962   4/1958  United Kingdom.
1085090  9/1967  United Kingdom.
1121960  7/1968  United Kingdom.
1254175  11/1971 United Kingdom.
1438677  6/1976  United Kingdom.
1493504  11/1977 United Kingdom.

Primary Examiner—Andres Kashnikow
Attorney, Agent, or Firm—Cushman, Darby & Cushman

[57] ABSTRACT

An ejector nozzle for a turbomachine comprising fixed inner and outer ducts 16,19 to the downstream ends of which is provided a mechanism for varying the geometry and area of the nozzle. A plurality of pivotal flaps 20,20a are mounted on the inner duct 16 for rotation about their pivots. An axially movable shroud 25 is provided downstream of the outer duct 19. A plurality of second flaps 23,23a are pivotally attached to the first flaps 20,20a and slide relative to the shroud 25. The second flaps 23 have openings therein and doors 30 to close the openings. Links 31 which are connected to the shroud 25 are used to open and close the doors. Rotation of the flaps 20,20a and axial movement of the shroud 25 alters the geometry of the nozzle and can be used to open air inlet openings on the downstream side of the flaps 20,20a and also open the doors 30 in the second flaps 23,23a to provide a mixer to reduce infrared radiation emitted by the hot gas plume from the engine.

5 Claims, 6 Drawing Figures

VARIABLE GEOMETRY EJECTOR NOZZLE FOR TURBOMACHINES

This invention relates to nozzles for gas turbine aero-engines and is particularly concerned with variable geometry nozzles and the suppression of the infra-red radiation emitted by the hot exhaust plume of such engines.

Modern combat aircraft require the flexibility of being able to fly at subsonic or supersonic speeds and to perform a variety of roles. In some roles it is necessary to augment the basic thrust produced by the engine in the "dry" mode by burning additional fuel downstream of the engine's turbines, utilizing the unburnt oxygen in the exhaust gases to support combustion. This mode is known as re-heat or afterburning. During re-heat it is necessary to increase the area of the nozzle to accommodate the increased volume of gases so as not to impair the efficient functioning of the engine. In other roles such as supersonic cruise, it is desirable to vary the geometry of the exhaust nozzle of the engine from a convergent geometry for subsonic speed to a configuration having an increased area throat (compared to that required during the "dry" mode or at subsonic cruise) formed between a convergent and divergent part of the nozzle—often referred to as a con-di nozzle.

There are times during the flight envelope of an aircraft when re-heat is not required and when the prime requisite is to reduce the infra-red emission of the exhaust plume and thereby reduce or avoid detection by heat seeking missiles directed towards the aircraft. These missiles usually detect the infra-red radiation of the hot exhaust gas plume and once the plume is located home in on the hot parts of the engine to destroy the aircraft.

There is a need for a nozzle design that not only caters for dry and reheat modes of operation, but also enables one selectively to reduce the infra-red emission of the engine.

An object of the present invention is to provide a variable geometry nozzle which is capable of use both in the dry and reheat modes of operation and also capable of reducing the infra-red emission of the hot exhaust gas plume.

The invention as claimed enables one to vary the geometry of the nozzle to cope with dry and reheat modes of operation by moving the flaps and enables one to reduce the infra-red emission by opening additional air inlets which admit ambient air to cool and shield the hot exhaust plume.

The nozzle of the present invention may be installed on a fixed jet pipe or on a vectorable jet pipe. Furthermore, the nozzle of the present invention may be installed on the vectorable front nozzles of an engine such as the Rolls-Royce Limited Pegasus engine which discharge cold or reheated by-pass air.

The invention will now be described by way of an example with reference to the accompanying drawings in which.

Figure 1:
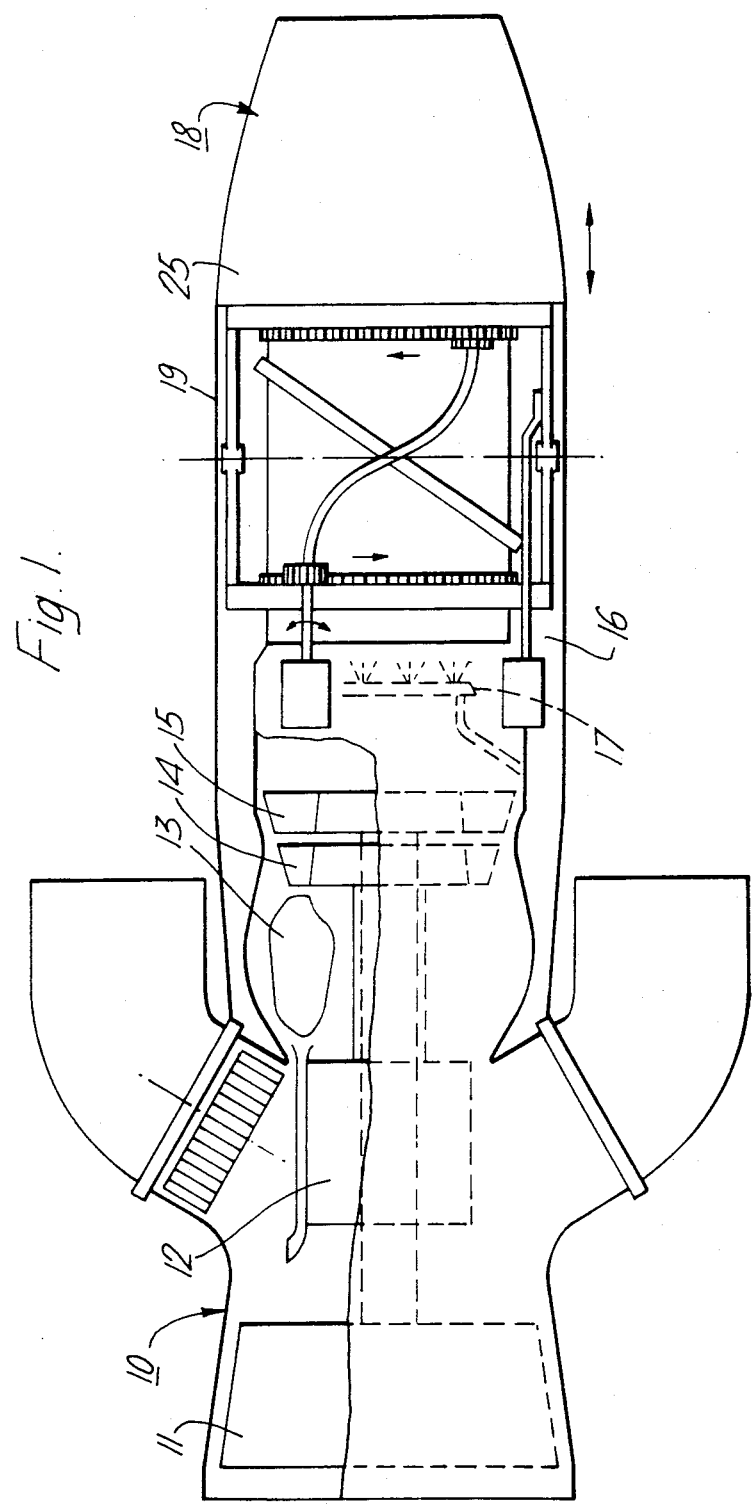
FIG. 1 illustrates schematically a gas turbine engine fitted with a variable geometry nozzle constructed in accordance with the present invention.

Referring to FIG. 1 there is shown schematically a gas turbine aero engine 10 comprising in flow series, an axial flow low pressure compressor 11, an axial flow high pressure compressor 12, a combustion chamber 13, a high pressure turbine 14 which drives the H.P. compressor 12, a low pressure turbine 15 which drives the L.P. compressor 11, a jet pipe 16 having a reheat burner 17, and a variable geometry nozzle 18 constructed in accordance with the present invention.

Figure 2:
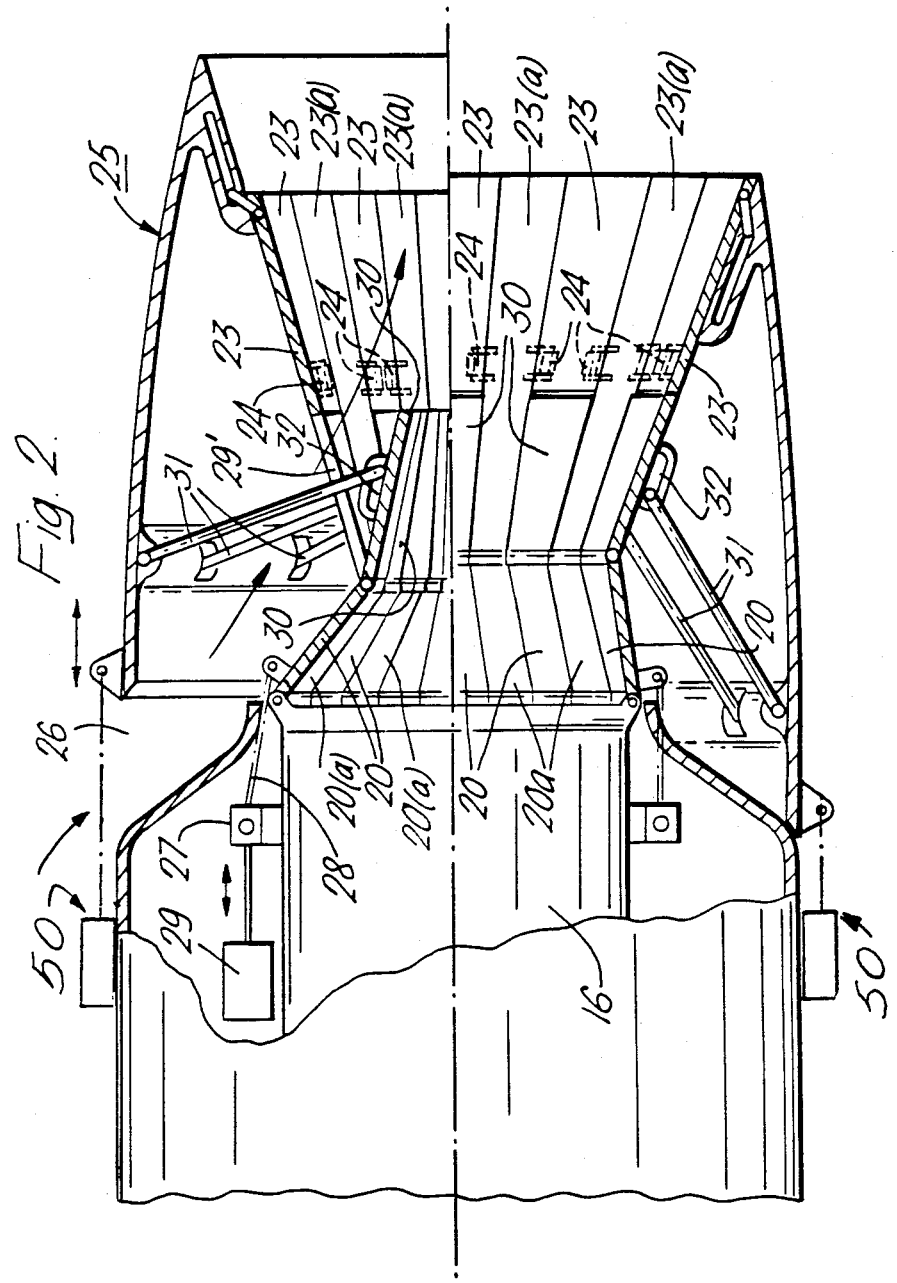
FIG. 2 illustrates in greater detail a cross-sectional view of part of the rear nozzle of the engine of FIG. 1.

Referring to FIG. 2 the nozzle 18 comprises two spaced ducts constituted by the jet pipe 16 and an outer casing 19. A circumferential axisymmetric array of first flaps 20 is provided downstream of the jet pipe 16.

Each of the flaps 20 is pivotally attached at its upstream end to the downstream end of the jet pipe 16. The flaps 20 are in the form of flat plates which are of trapezoidal shape. Alternate flaps 20a overlap adjacent flaps 20 to form seal plates that close off the circumferential gaps between the adjacent flaps 20.

Located downstream of the flaps 20 is a circumferentially extending array of spaced flaps 23. Each of the flaps 23 is pivotally attached at its upstream end to the downstream end of one of the flaps 20. Here again alternate flaps 23a constitute seal plates that seal off the gaps between adjacent flaps 23. The seal plates 23a are pivotally connected at their upstream ends to the downstream end of the flaps 20a. The flaps 23a are provided with rollers 24 that are mounted on a flange on the flap 23a that projects through the gap between adjacent flaps 23. The rollers 24 engage the outer surface of adjacent flaps and prevent both the seal plates 23a and the seal plates 20a from falling inwards. The downstream ends of the flaps 23 and 23a are mounted to slide relative to the downstream end of the shroud 25.

An axially movable shroud 25 is provided downstream of the duct 19. The shroud 25 is moved axially downstream and upstream by conventional means shown schematically at 50 in FIG. 2. An air inlet opening (or openings) 26 is provided at the downstream end of the duct 19. The opening may extend around the whole circumference of the duct 19 or around part.

The flaps 20 and 20a are provided with means, such as a unison ring 27 and links 28 operated by screw jacks 29 so that they can be rotated about their pivots independently of the movement of the shroud 25. Other means of operating the flaps 20 and 20a could be employed.

All, or at least some, of the flaps 23, are provided with openings 29' (FIGS. 2 and 4) which are closed by doors 30. Each of doors 30 are flaps which are pivotally attached at their upstream end edge to the respective upstream edge of the second flap and/or to the downstream edge of the respective one of the first flaps on the same axis of the pivotal attachment of the respective second flap 23 to the one of the first flaps 20. Each door 30 has pivotally attached to it, a telescopic link 31 which slides in a slot 32 on the door. The links 32 are pivotally attached to the shroud 25.

In operation, for a dry mode of operation, the shroud 25 is moved rearwardly and the flaps 20,20a are set to define a convergent part of the nozzle with a minimum area throat. In this position, shown in the upper part of FIG. 2, the flaps 23,23a define a wide divergent portion. The length of the links 31 is chosen to hold all of the doors 30 open when the shroud 25 is located rearmost and the flaps 20 together with the doors 30 define the minimum area throat. In this position of the shroud 25, the inlet 26 is open and ambient air entering the void between the shroud 25 and the flaps 20,23 leaves via the gaps formed by the open doors 30. This reduces the infrared emission of the of the gas plume. Furthermore, the doors 30 restrict the direct view of the hot turbines from the rear of the engine.

To operate in a re-heat mode the flaps 20 are moved to define a pre-selected area of throat that is larger than the area required for a subsonic dry mode and the shroud 25 is simultaneously moved forwards. The shroud 25 closes off the opening 26 and the flaps 20 and 23 define a convergent and divergent nozzle. The doors 30 are held closed by the links 31.

For supersonic cruise conditions, a convergent-divergent nozzle is formed by retaining the shroud 25 in its foremost position and rotating the flaps 20 to define the same throat area as would be required for the subsonic dry mode. This movement pulls the upstream ends of the flaps 23 inwards to define a more divergent part of the nozzle downstream of the throat than is required during reheat. Here again the doors 30 are held closed by the links 31.

Figure 3:
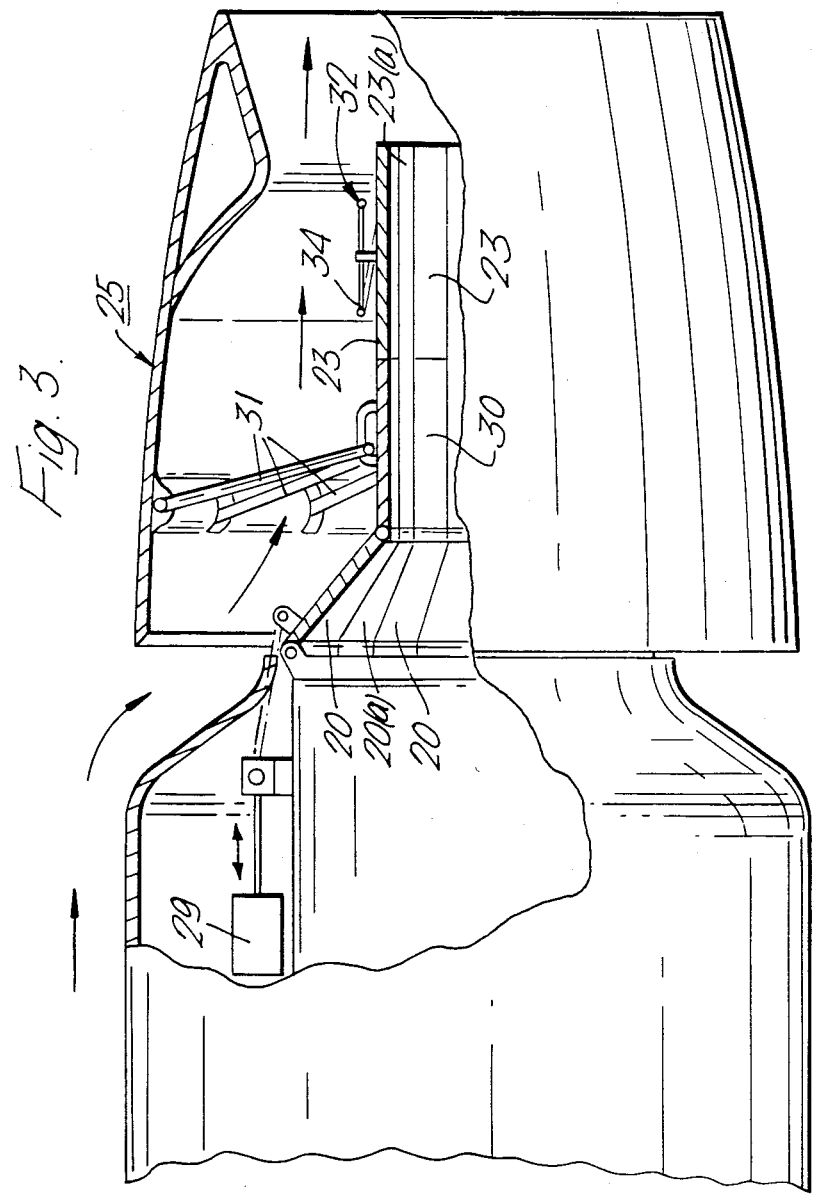
FIGS. 3 to 6 illustrate alternative nozzles to that shown in FIG. 2.

With the nozzle shown in FIG. 2, in the dry mode the ejector doors 30 are opened. For a dry mode, without the doors 30 open, the nozzle of FIG. 2 can be modified as shown in FIG. 3. Referring to FIG. 3, the flaps 23 are not connected to the outer shroud 25 at their downstream ends. Instead, the attitude of flaps 23 is determined by means of a conventional hoop-tensioning mechanism.

Figure 4:
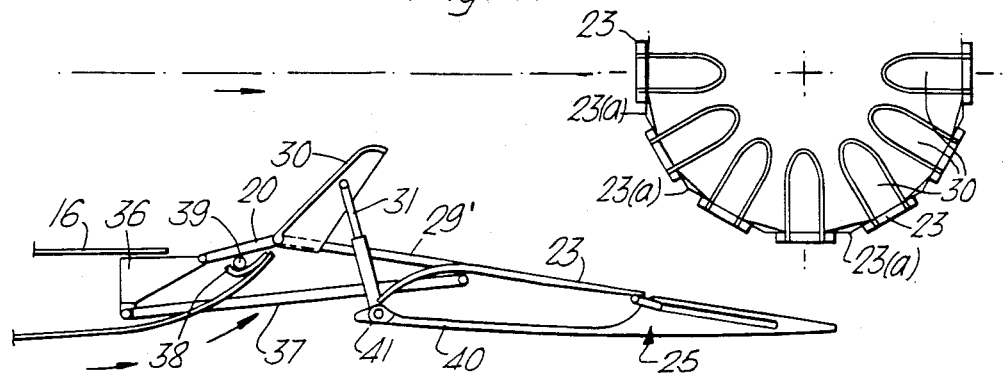
Figure 5:
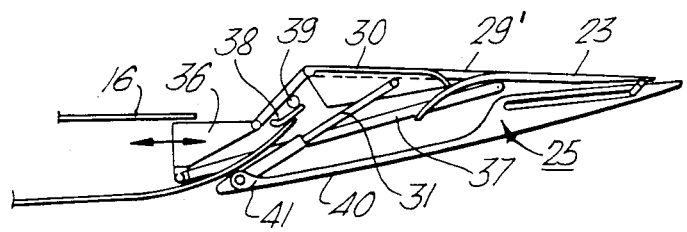
Figure 6:
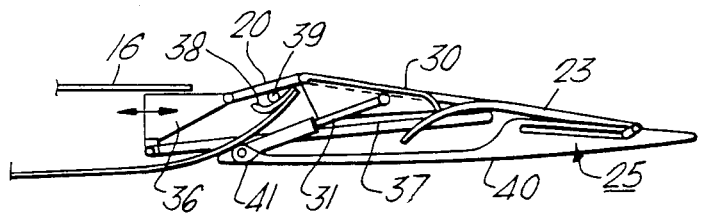

Referring to FIGS. 4 to 6, there is shown a nozzle in respectively ejector mode, dry mode, and reheat mode. The flaps 20 are mounted on a member 36, which may be fixed or axially movable, and each flap 23 is interconnected to the member 23 by means of a pivotally mounted strut 37.

In the case where member 36 is fixed, an actuation means similar to the unison ring 27, push rods 28, and motors 29 shown in FIG. 2, is provided to rotate the flaps 20 about their pivotal attachment to the member 36. This in turn adjusts the attitude of the flaps 23 causing them to rock about the ends of the struts 36.

In the case where member 36 is movable axially, fixed cams 38 are provided against which cam followers 39 operate so that axial movement of member 36 rotates the flaps 20 about their pivotal attachment to member 36 as shown in FIGS. 4 to 6.

In both cases, axial movement of the shroud 25 rearwards, relative to the point of pivotal attachment of flaps 20 to the member 36, causes the links 31 to push open the doors 30. The links 31 are telescopic and are biassed to expand and thereby urged the door closed when the shroud 25 is forwards.

The shroud 25 comprises a plurality of pivotal flaps 40 mounted at their upstream ends on a fixed diameter annular ring 41 and pivotally and slidably mounted at their downstream ends to the downstream ends of the flaps 23.

We claim:

1. A nozzle for a gas turbine aeroengine comprising spaced inner and outer ducts, one or more air inlet openings located at the downstream end of the outer duct, a movable shroud extending downstream of the outer duct, a circumferential array of first flaps each of which is pivotally attached to the inner duct, a circumferential array of second flaps each of which is pivotally attached to the downstream end of one of the first flaps and in slidable contact at its downstream end with the shroud, a plurality of the second flaps being provided with an opening therein and a door in each opening, each of the doors being pivotally attached at its upstream end to a region adjacent the upstream end of the second flaps, a plurality of links each of which is pivotally attached at one end to the shroud and pivotally attached at its other end to one of the doors, a first actuation means operable on the first flaps to rotate them in unison about their pivotal attachments to the inner duct thereby to define a convergent throat of the nozzle and simultaneously move the upstream ends of the second flaps, and a second actuation means operable on the shroud to move the shroud to and from a first position, where the shroud obturates the said inlet opening or openings, to and from a second position, downstream of the first position, where the shroud uncovers the said inlet opening or openings, and simultaneously causes the said links to push the doors open to form a mixer region downstream of the throat whereby air entering the air inlet opening or openings and the openings in the second flaps intermixes with hot gases flowing through the throat of the nozzle.

2. A nozzle according to claim 1 wherein the doors are pivotally attached to the upstream edge of the second flap.

3. A nozzle according to claim 1 wherein the doors are pivotally attached to the downstream edge of the first flaps.

4. A nozzle according to claim 1 wherein alternate flaps of each array of first and second flaps overlap adjacent flaps and constitute sealing plates to close off the gaps between adjacent flaps, and means are provided for constraining the sealing plates from falling inwards.

5. A nozzle according to claim 1 wherein the shroud comprises a hollow cylindrical upstream portion, a downstream portion of the shroud comprises a plurality of third flaps pivotally attached to the upstream portion of the shroud, and the second flaps are pivotally attached at their downstream end to the downstream end of the third flaps.

* * * * *

UNITED STATES PATENT AND TRADEMARK OFFICE
CERTIFICATE OF CORRECTION

PATENT NO. : 4,502,636
DATED : March 5, 1985
INVENTOR(S) : NIGHTINGALE et al

It is certified that error appears in the above-identified patent and that said Letters Patent is hereby corrected as shown below:

Column 3, line 51, delete "expand" and insert --contract--
Column 3, line 51, delete "urged" and insert --urge--
Column 3, line 52, delete "forwards" and insert --forward--

Signed and Sealed this

First Day of October 1985

[SEAL]

Attest:

DONALD J. QUIGG

Attesting Officer

Commissioner of Patents and
Trademarks—Designate